United States Patent
Rivas et al.

(10) Patent No.: US 7,942,997 B2
(45) Date of Patent: May 17, 2011

(54) HIGH RESOLUTION INKJET PRINTER

(75) Inventors: Rio Rivas, Corvallis, OR (US);
Lawrence H. White, Corvallis, OR (US); Ed Friesen, Corvallis, OR (US);
John B. Rausch, Freedom Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 12/099,606

(22) Filed: Apr. 8, 2008

(65) Prior Publication Data

US 2009/0250162 A1    Oct. 8, 2009

(51) Int. Cl.
| B29C 65/02 | (2006.01) |
| B32B 37/02 | (2006.01) |
| B32B 37/06 | (2006.01) |
| B32B 37/14 | (2006.01) |
| B32B 38/04 | (2006.01) |
| H01L 21/00 | (2006.01) |

(52) U.S. Cl. ..... 156/252; 156/264; 156/322; 156/307.1; 156/308.2

(58) Field of Classification Search ............ 438/21; 156/150, 252, 264, 322, 307.1, 308.2
See application file for complete search history.

(56) References Cited

U.S. PATENT DOCUMENTS

| 2,475,456 | A | * | 7/1949 | Norlander ............ 335/286 |
| 4,773,971 | A | | 9/1988 | Lam et al. |
| 4,953,287 | A | * | 9/1990 | West et al. ............ 29/611 |
| 5,865,928 | A | * | 2/1999 | Lariviere et al. ........ 156/256 |
| 6,039,438 | A | | 3/2000 | Beerling |
| 6,145,963 | A | | 11/2000 | Pidwerbecki et al. |
| 6,158,846 | A | | 12/2000 | Kawamura |
| 6,350,017 | B1 | | 2/2002 | Kamada |
| 6,402,296 | B1 | * | 6/2002 | Cleland et al. ........ 347/40 |
| 7,044,585 | B2 | | 5/2006 | Walmsley et al. |
| 2002/0163558 | A1 | | 11/2002 | Rivas et al. |
| 2003/0058309 | A1 | | 3/2003 | Haluzak et al. |
| 2003/0132990 | A1 | | 7/2003 | Mitani |
| 2003/0197757 | A1 | | 10/2003 | Bates et al. |
| 2003/0197758 | A1 | | 10/2003 | Sasaki et al. |
| 2003/0202046 | A1 | * | 10/2003 | Abdelli et al. ........ 347/47 |

FOREIGN PATENT DOCUMENTS

| EP | 0784105 | 7/1997 |
| EP | 1013433 | 6/2000 |
| EP | 0899109 | 7/2003 |
| JP | 411123829 A | * 5/1999 |

* cited by examiner

*Primary Examiner* — Linda L Gray

(57) ABSTRACT

A method of manufacturing a printhead for an inkjet print cartridge includes depositing a metal film on a mandrel; separating the metal film from the mandrel, mounting the metal film to a work holder, modifying the metal film while the metal film remains mounted on the work holder, laminating the metal film to a barrier material and semiconductor substrate to form a printhead, and applying heat to the printhead such that the printhead barrier layer is cured and the metal film is bonded thereto. Laminating the metal film to the barrier material includes preheating the barrier material and placing the metal film on the preheated barrier material.

17 Claims, 10 Drawing Sheets

HIGH RESOLUTION INKJET PRINTER

BACKGROUND OF THE INVENTION

The present invention is generally related to components that comprise a high-resolution inkjet printer and is more particularly related to a printhead capable of a large number of dots-per-inch (dpi) placement of ink on a medium for a high-resolution printer.

Simply stated, inkjet printers operate by expelling a small volume of ink through a plurality of small orifices in an orifice plate held in proximity to a paper or other medium upon which printing or marks are to be placed. These orifices are arranged in a fashion in the orifice plate such that the expulsion of droplets of ink from a selected number of orifices relative to a particular position of the medium results in the production of a portion of a desired character or image. Controlled repositioning of the orifice plate or the medium followed by another expulsion of ink droplets results in the creation of more segments of the desired character or image. Furthermore, inks of various colors may be coupled to individual arrangements of orifices so that selective firing of the orifices will produce a multi-colored image on the medium.

Several mechanisms have been employed to create the force necessary to expel an ink droplet from a printhead, among which are thermal, piezoelectric and electrostatic mechanisms. While the following explanation is made with reference to the thermal inkjet expulsion mechanism, the present invention may have application for the other ink expulsion mechanisms as well.

Expulsion of the ink droplet in a conventional thermal inkjet printer is a result of rapid thermal heating of the ink to a temperature that exceeds the boiling point of the ink solvent to create a vapor phase bubble of ink. Such rapid heating of the ink is generally achieved by passing a pulse of electric current, typically for one to three microseconds, through an ink ejector that is typically an individually addressable heater resistor. The heat generated thereby is coupled to a small volume of ink held in an enclosed area associated with the heater resistor and which is generally referred to as a firing chamber. For a printhead, there are a plurality of heater resistors and associated firing chambers—perhaps numbering in the hundreds—each of which can be uniquely addressed and caused to eject ink upon command by the printer. The heater resistors are deposited in a semiconductor substrate and are electrically connected to external circuitry by way of metalization deposited on the semiconductor substrate. Further, the heater resistors and metalization may be protected from chemical attack and mechanical abrasion by one or more layers of hard and non-reactive passivation. Additional description of basic printhead structure may be found in "The Second-Generation Thermal Inkjet Structure" by Ronald Askeland, et al. in the Hewlett-Packard Journal, August 1988, pages 28-31. Thus, one of the boundary walls of each firing chamber consists of the semiconductor substrate (and typically one firing resistor). A foraminous orifice plate forms another of the boundary walls of the firing chamber, disposed opposite the semiconductor substrate in one common implementation. Generally, each of the orifices in this orifice plate is arranged in relation to a heater resistor in a manner in which enables ink to be directly expelled from the orifice. As the ink vapor nucleates at the heater resistor and expands, it displaces a volume of ink that forces a lesser volume of ink out of the orifice for deposition of the medium. The bubble then collapses and the displaced volume of ink is replenished from a larger ink reservoir by way of an ink feed channel in one of the boundary walls of the firing chamber.

As users of inkjet printers have begun to desire finer detail in the printed output from a printer, the technology has been pushed into a higher resolution of ink droplet placement on the medium. One of the common ways of measuring the resolution is the measurement of the maximum number of ink dots deposited in a selected dimension of the printed medium, commonly expressed as dots per-inch (dpi). The production of an increased number of dots per inch requires smaller droplets. Smaller ink droplets means lowered drop weight and lowered drop volume for each droplet. Production of low drop weight ink droplets requires smaller structures in the printhead. Merely making structures smaller, however, ignores the fact that complex interactions between the various structures make the optimization of a printhead design quite complex. Thus, it is desirable that an optimization be reached so that improved resolution may be realized with acceptable throughput and cost.

Conventionally, an orifice plate for a thermal inkjet printer printhead is formed from a sheet of metal perforated with a plurality of small holes leading from one side of the metal sheet to the other. There has also been increased use of a polymer sheet through which holes have been created by ablation or other means. In the metal orifice plate example, the process of manufacture has been well described in the literature. See, for example, Gary L. Siewell, et al., "The Think Jet Orifice Plate: A Part With Many Functions", Hewlett-Packard Journal, May 1985, pages 33-37; Ronald A. Askeland, et al., "The Second-Generation Thermal Inkjet Structure", Hewlett-Packard Journal, August 1988, pages 28-31; and U.S. Pat. No. 5,167,776 "Thermal Inkjet Printhead Orifice Plate and Method of Manufacture".

Providing an orifice plate with a larger number of orifices (higher dpi) requires that the orifices be smaller in diameter and more closely spaced. However, the smaller orifice diameters and closer spacing tend to result in thinner orifice plates. One prior art orifice plate of 600 dpi, disclosed in U.S. Pat. No. 6,402,296 (a patent that is commonly assigned herewith and which is hereby incorporated by reference), has a thickness on the order of about 20-25 microns. However, orifice plates thinner than about 20 microns tend to suffer the serious disadvantage of being too flimsy to handle, likely to break apart in a production environment, or likely to become distorted by heat processing of the printhead. Such orifice plates are typically manufactured by electroforming nickel on a mandrel and subsequently plating with a protecting metal layer.

Accordingly, it is desirable to provide an orifice plate for a thermal inkjet printer having a dpi of 1200-2400 or higher and a method for producing the same.

SUMMARY OF THE INVENTION

A printhead for an inkjet printer provides high-resolution printing by employing a substrate including at least one ink ejector on its surface and an orifice plate affixed to the substrate. The orifice plate has a plurality of orifices disposed through it from a first surface proximate the surface of the substrate to a second surface distal to the surface of the substrate. The orifice plate has a thickness in the range of about 6 to 19 microns and at least two orifices of the plurality of orifices have centers at the second surface spaced apart by a distance of about 15 to 75 microns. Each of the at least two orifices has an orifice opening at the second surface with a diameter having a range of greater than or equal to 3 microns.

DETAILED DESCRIPTION OF THE PREFERRED EMBODIMENTS

Figure 1A:
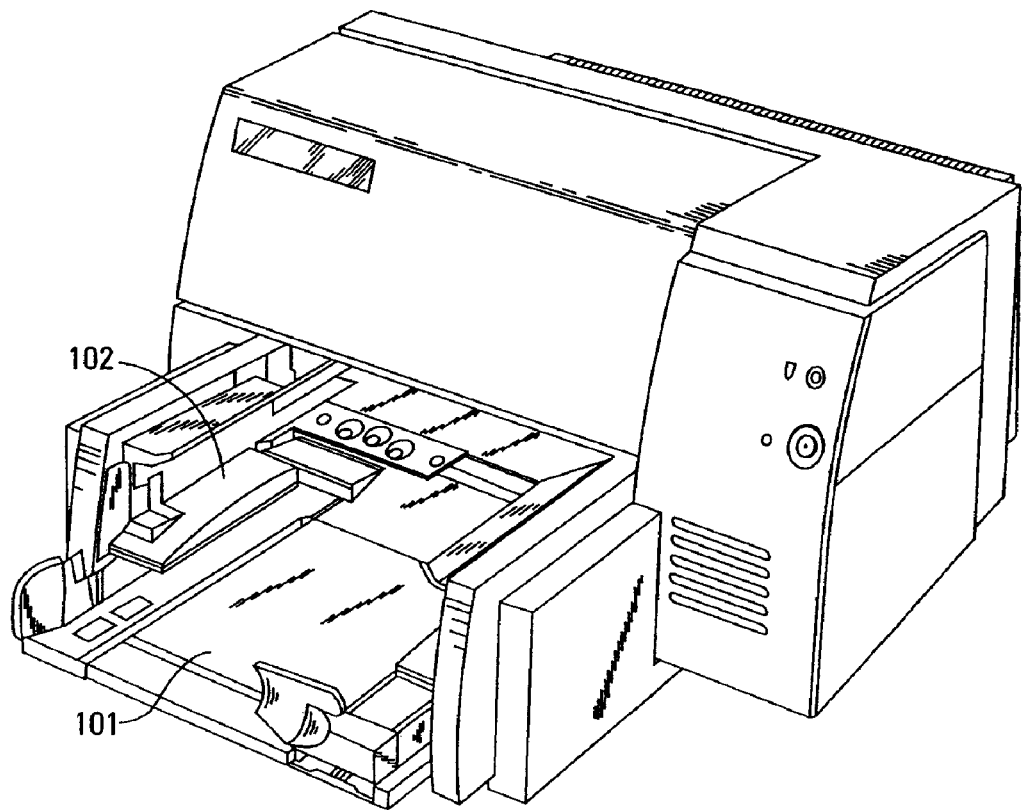
FIG. 1A is an isometric drawing of a typical printer, which may employ the present invention.
Figure 1B:
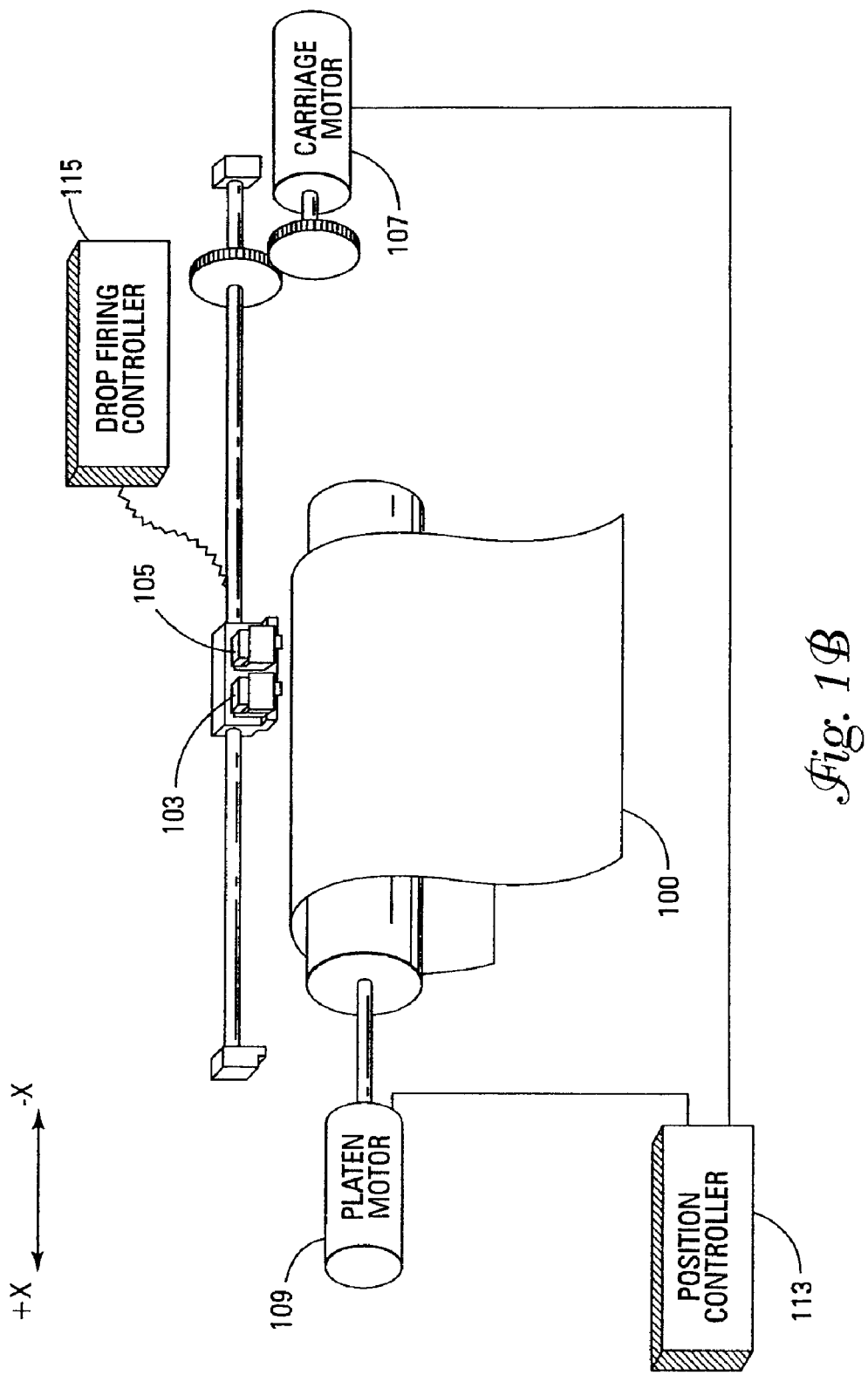
FIG. 1B is a diagram of the basic operational elements of the printer of FIG. 1A.

In order to achieve the desirable performance described above, a printhead disposed on a print cartridge for use in an inkjet printer is optimized to provide print resolutions of 1200 to 2400 dpi or greater in a printing system. One embodiment of an inkjet printer that may employ the present invention is illustrated in the isometric drawing of FIG. 1A. While the illustrated printer is similar to a DeskJet model 890C available from Hewlett-Packard Company, other inkjet printers having different configurations and modes of operation may profitably benefit from the present invention. Paper or other media, which may be printed upon, is stored in the input tray 101. Referring to FIG. 1B, a single sheet of media is advanced into the printer print area by a platen motor 109 and held against a platen. One or more inkjet print cartridges 103, 105 are incrementally drawn across the medium 100 on the platen by a carriage motor 107 in a direction perpendicular to the direction of entry of the medium. The platen motor 109 and the carriage motor 107 are typically under the control of a media and cartridge position controller 113. An example of such positioning and control apparatus may be found described in U.S. Pat. No. 5,070,410, hereby incorporated by reference. Thus, the medium 100 is positioned in a location so that the print cartridges 103 and 105 may eject droplets of ink to place dots on the medium as required by the data that is input to a drop firing controller 115 of the printer. These dots of ink are expelled from selected orifices in a printhead element of selected print cartridges in a band parallel to the scan direction as the print cartridges 103 and 105 are translated across the medium by the carriage motor 107. When the print cartridges 103 and 105 reach the end of their travel at an edge of the medium 100, the medium is typically incrementally advanced by the media and cartridge position controller 113 and the platen motor 109. The print cartridges 103 and 105, having reached the end of their traverse in the X direction on a bar or other print cartridge support mechanism, are either returned back along the support mechanism while continuing to print or returned without printing. The medium may be advanced by an incremental amount equivalent to the width of the ink ejecting portion of the printhead or some fraction thereof. Control of the medium, positioning of the print cartridge, and selection of the correct ink ejectors for creation of an ink image or character is determined by the controller 113 which may be implemented in a conventional electronic hardware configuration. Once printing of the medium is complete, the medium is advanced into the output tray 102 for user removal. See for example "Color Thermal Inkjet Printer Electronics" by Jennie L. Hollis et al., Hewlett-Packard Journal, August 1988, pages 51-55; "Integrating the Printhead into the HP DeskJet Printer" by J. Paul Harmon et al., Hewlett-Packard Journal, October 1988, pages 62-66; and "DeskJet Printer Chassis and Mechanism Design", by Larry A. Jackson et al., Hewlett-Packard Journal, October 1988, pages 67-75.

Figure 2:
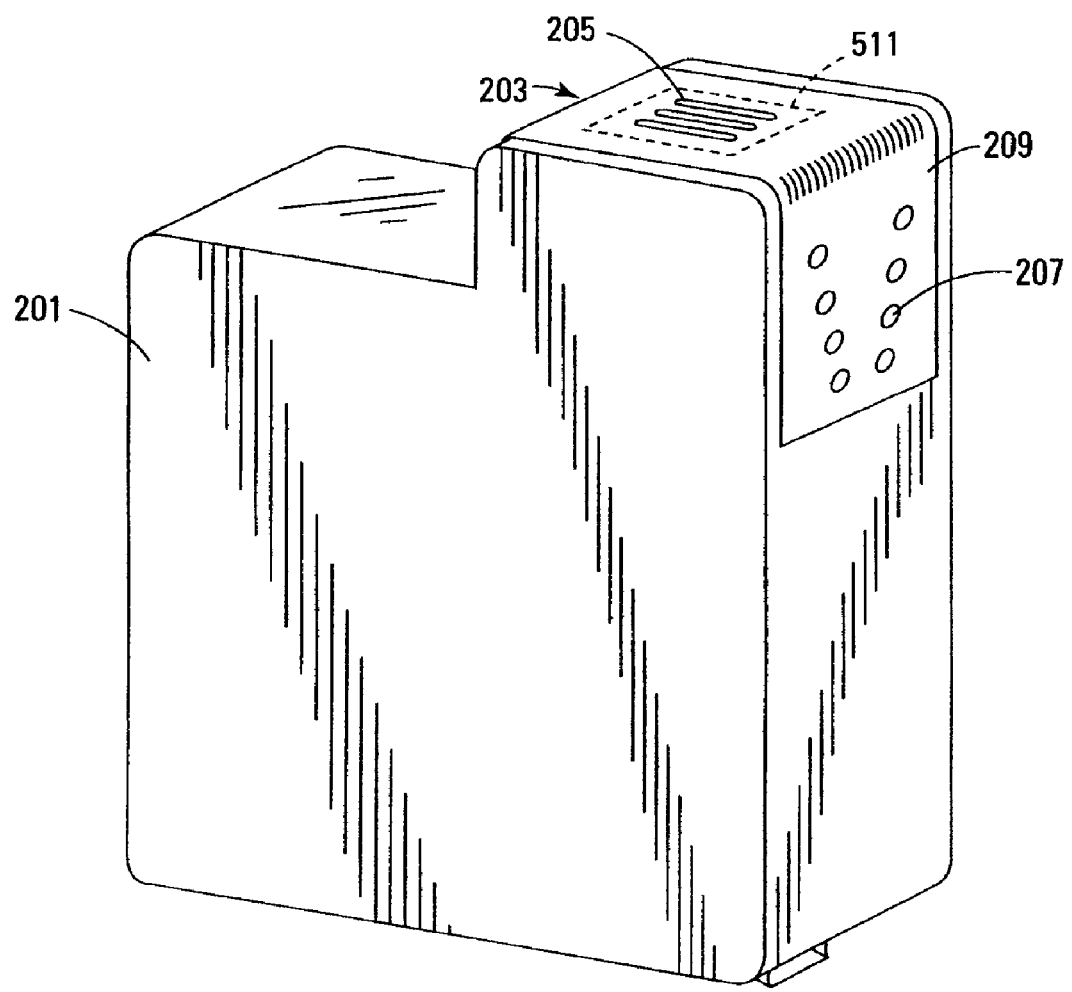
FIG. 2 is an illustration of a multi-color inkjet print cartridge which may be employed in the printer of FIG. 1 and which may utilize the printhead of the present invention.

An inkjet print cartridge that may be employed in the printer of FIG. 1 is represented in the drawing of FIG. 2. A cartridge body member 201 houses a supply of ink and includes internal passageways to route the ink to a printhead 203 via ink conduits. In an embodiment of the present invention that is adapted for multi-color printing, printhead 203 has an orifice plate 511 that has three groupings of orifices, one for each color (cyan, magenta, and yellow), are arranged on the surface of the printhead. One such orifice grouping is identified as grouping 205. Ink is selectively expelled for each color under control of commands from the printer that are communicated to the printhead 203 through electrical connections 207 and associated conductive traces (not shown) on a flexible polymer tape 209. These conductive traces are coupled to the metalized conductors on a semiconductor substrate of the printhead for coupling to each ink ejection mechanism. In one embodiment of an inkjet print cartridge, the printhead is constructed from a semiconductor substrate, including thin film heater resistors disposed in the substrate, a photo definable barrier and adhesive layer, and a foraminous orifice plate that has a plurality of orifices extending entirely through the orifice plate. Physical and electrical connections from the substrate are made to the polymer tape 209 by way of lead bonding or similar semiconductor technology and are subsequently secured by an epoxy-like material for physical strength and fluid rejection. In the preferred embodiment, the polymer tape 209 is formed of Kapton™, commercially available from 3M Corporation, but a similar material that can be photo-ablated or chemically etched to produce openings and other desirable characteristics may also be used. Copper or other conductive traces are deposited or otherwise secured on one side of the tape so that electrical interconnections 207 can be contacted with the printer and routed to the substrate. As in the illustrated embodiment, the tape is typically bent around an edge of the print cartridge as shown and secured.

Figure 3:
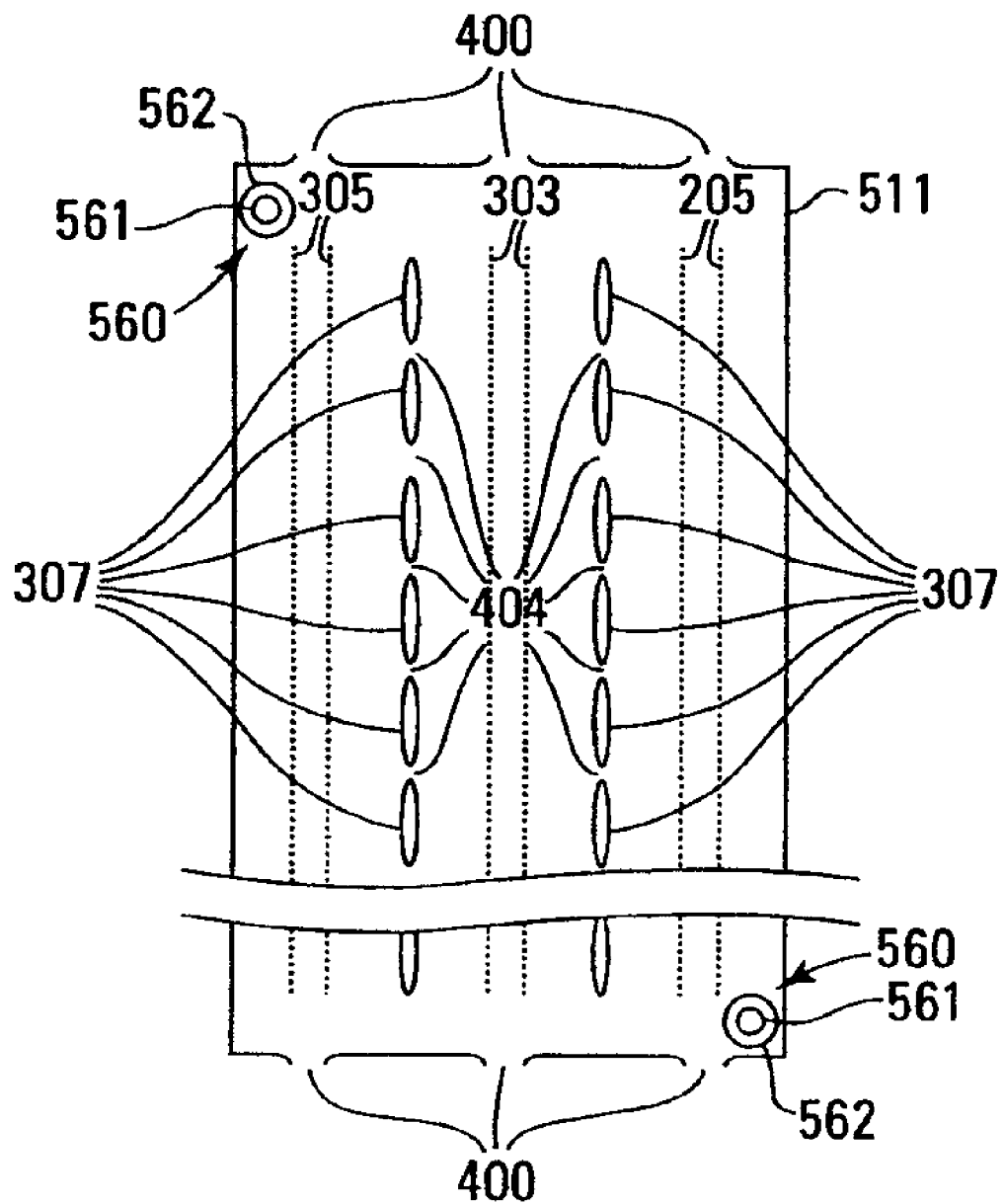
FIG. 3 is a plan view of a multi-color printhead illustrating a multiplicity of ink-emitting orifices arranged in three-color groups and in two linear rows for each group.

A planar view of the outer surface of one embodiment of orifice plate 511 is shown in the diagram of FIG. 3. In this embodiment, three groupings of nozzles, 205, 303 and 305, (one grouping for cyan, one grouping for magenta, and one grouping for yellow) are visible, each grouping consisting of two parallel lines of orifices having 300 individual orifices. It is to be understood that the number of orifices in each grouping may be varied to achieve a desired print density. Careful observation of FIG. 3 reveals that there is a slight stagger between neighboring orifices relative to a true straight line. This stagger enables the orifices to be placed closer together along the line of orifices as well as reducing the amount of fluidic cross talk between neighboring orifices when the ink ejector is activated for any one of the firing chambers associated with the orifice. Although the lines of orifices casually appear parallel to each other, a slight stagger between neighboring orifices in each line is present and provides a higher density of dot placement. In a typical implementation, ink is fed to each firing chamber associated with each orifice by being fed through a slot in the semiconductor substrate (not shown) that is disposed essentially between the two parallel lines of orifices shown for each color.

In one embodiment, the orifice plate 511 is approximately 14,000 microns long (in the direction parallel to the lines of orifices) and approximately 7,000 microns in width. In another embodiment, the printhead is approximately 25,000 microns long.

One embodiment of the orifice plate 511 includes moats 307. The moats 307 prevent ink from one grouping of orifices from mixing with ink from the remaining groupings of orifices. Colorants or inks from one grouping of orifices will be substantially captured in the moats 307 before it flows or is dragged across the orifice plate 203 from one grouping of orifices to another grouping. Moats 307 also reduce stress in the assembled printhead structure and in doing so, improve the planarity of the orifice plate 203.

Figure 4:
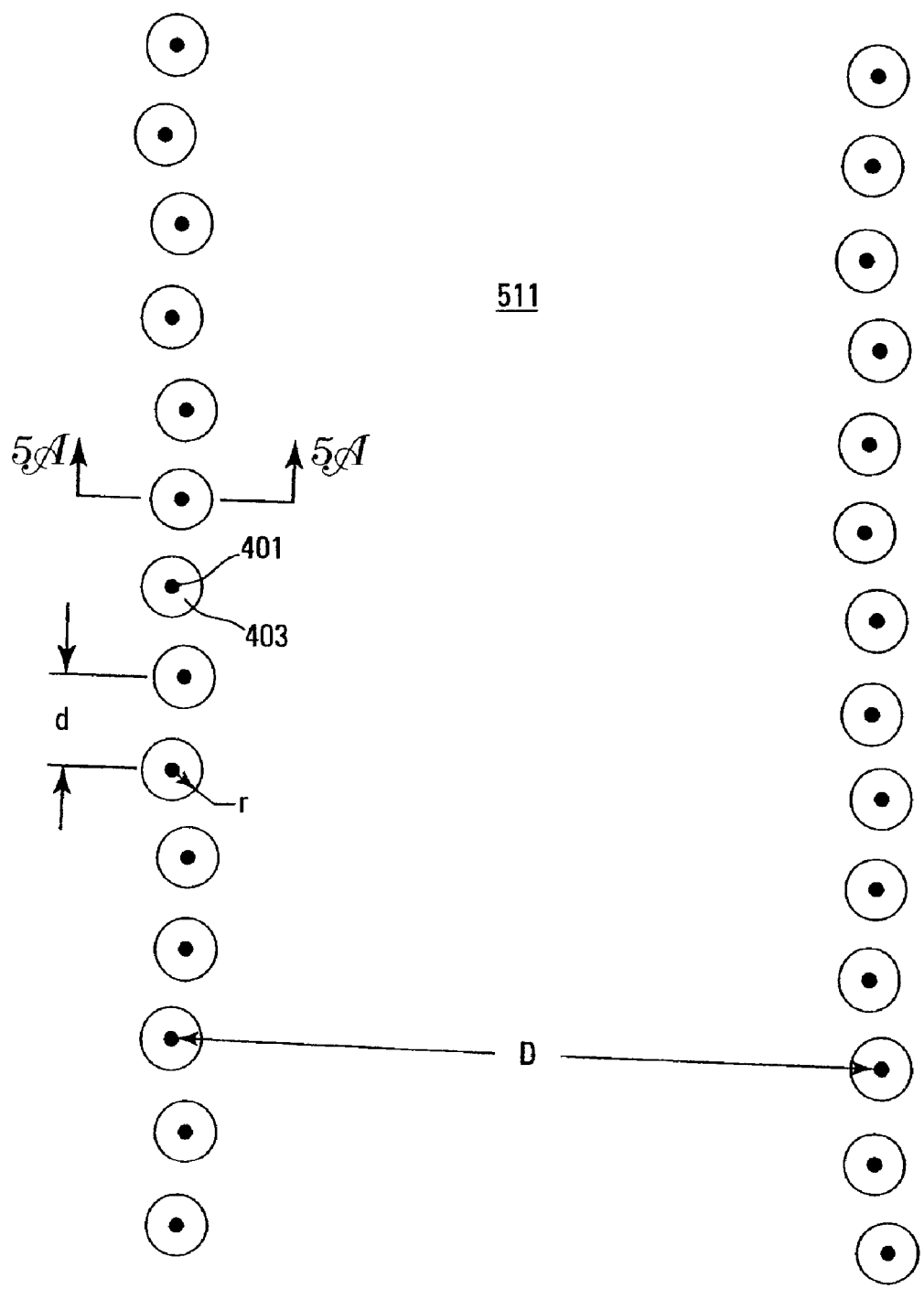
FIG. 4 is an enlarged plan view of the printhead surface illustrated in FIG. 3 and illustrating some of the inter-relationships of the ink emitting orifices of the printhead.

A close-up of a portion of the outer surface of the orifice plate 511 is shown in the plan view of FIG. 4. In a view of this magnification, it is possible to identify the outer surface opening of the orifice bore 401 as well as being able to identify the indentation 403 which surrounds the opening of the orifice bore. In one embodiment, the indentations 403 have a radius, r, which ranges between 7 and 20 microns. In this embodiment, the distance, d, between the centers of the adjacent nozzle openings (which is equivalent to the centerline of the orifice running through the orifice plate) ranges between 15 and 75 microns.

Figure 5:
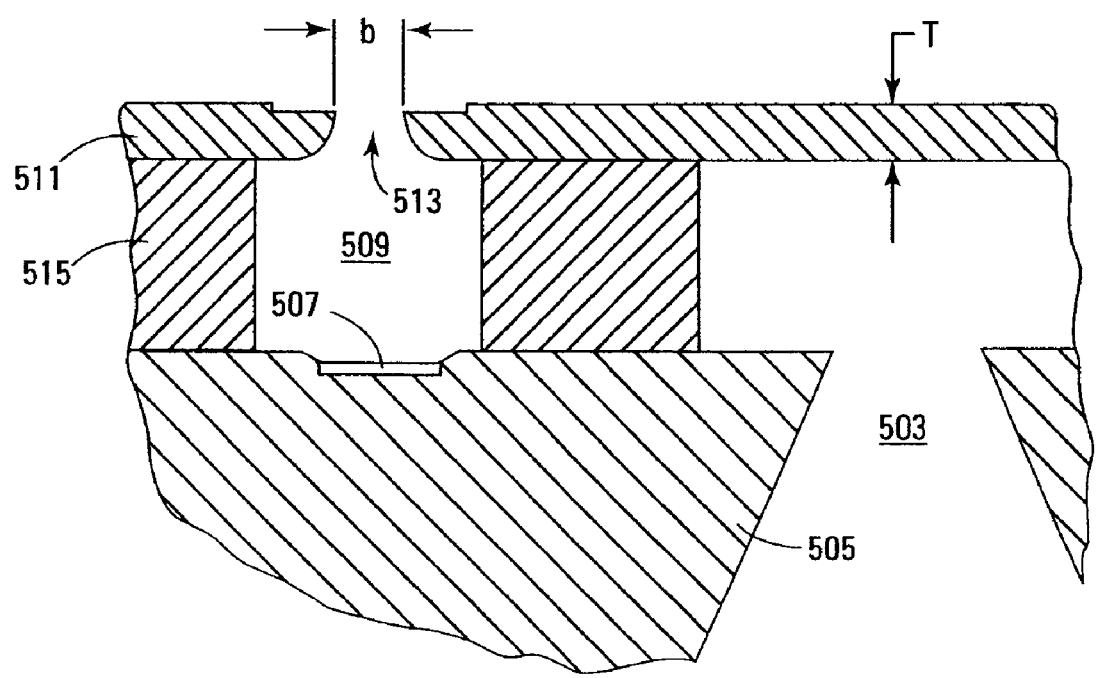
FIG. 5 illustrates a cross section of one firing chamber of the printhead of FIG. 4 as taken across section line A-A.

A cross section of one orifice and its associated firing chamber is shown in FIG. 5. This cross section is taken at A-A of FIG. 4. In the illustrated embodiment, ink is supplied to the printhead by way of an ink slot 503 in the printhead substrate 505. The ink slot 503 may be located between the two lines of orifices as described previously, or two slots may be located on opposing sides of the lines of orifices. A thin film heater resistor 507 is disposed on one boundary wall of the firing chamber 509 and an opposite boundary wall is formed by the orifice plate 511 that positions the orifice 513 essentially over the heater resistor 507. In the preferred embodiment, a barrier material 515 is used to affix the orifice plate 511 to the semiconductor substrate 505 and further defines additional boundary walls of the firing chamber 509 as well as providing ink feed channels (not shown) to the firing chamber 509.

The orifice plate 511 is typically produced by electroforming a metallic material such as nickel on a mandrel having insulating features with appropriate dimensions and suitable draft angles to produce the features desired in the orifice plate. Upon completion of a predetermined amount of time, and after a thickness of the metallic electroform material has been deposited, the resultant metallic film is removed and treated for use as an orifice plate. The base metal orifice plate is then coated with a precious metal such as gold, platinum, palladium, or rhodium to resist corrosion. Following its fabrication, the orifice plate is affixed to the semiconductor substrate 505 with the barrier material 515. The orifices created by the electroforming of the nickel on the mandrel extend from the inner surface of the orifice plate 511 to the outer surface of the orifice plate. It is a feature of one embodiment that the orifices of the orifice plate, after treatment and plating, provide an opening on the outer surface of the orifice plate 511 having a diameter b of at least 3 microns. In another embodiment, the opening may have a diameter of between 3 and 20 microns. In yet another embodiment, the openings, or bores 401, across an orifice plate 511 may have different diameters. For example, openings of different sizes may be arranged such that openings of relatively larger and smaller sizes alternate with one another. Alternatively, the openings or bores 401 of the respective columns of orifices may be of different sizes. In these embodiments, the thickness, T, of the orifice plate is in the range of between 6 and 19 microns.

The substrate 505 and the orifice plate 511 are secured together by a barrier layer 515 as previously described to form a print heat assembly. In the preferred embodiment, the barrier layer 515 is disposed on the substrate 505 in a patterned formation such that firing chambers, such as chamber 509, are created in areas around the heater resistors. The barrier layer material is also patterned so that ink is supplied independently to the firing chambers 509 by one or more ink feed channels in the barrier material. In the preferred embodiment, the barrier layer 515 comprises of polymeric photo definable material such as IJ5000™, Parad™, Vacrel™, SU8™ or other materials such as those described in European Patent Application No. EP 0 691 206 A2 "Ink Jet Printhead Photoresist Layer Having Improved Adhesion Characteristics", published Jan. 10, 1986, which are a film negative, photo sensitive, multi-component, polymeric dry film which polymerizes with exposure to light or similar electromagnetic radiation. Materials of this type are available from E.I. DuPont deNemoirs Company of Wilmington Del. or Microchem Corp, of Newton Mass.

In one embodiment, multiple orifice plates 511 are manufactured on a mandrel in a single electroform sheet 555 having a side dimension of approximately 12.7 centimeters and are subsequently separated from the mandrel. Nickel is the metal of choice for a printhead orifice plate because it is inexpensive, easy to electroform, and electroforms into intricate shapes. Other materials, including but not limited to, copper, palladium, gold, palladium/nickel alloy, and iron/nickel alloy may be used to form all or part of an orifice plate 511. Of particular interest to those forming orifice plates, small holes can be conveniently created in the orifice plate by electrically insulating small portions of the otherwise conductive mandrel, thereby preventing the electrodeposition of the electroform material on what is an electrically conductive cathodic electrode in a modified Watts-type mixed anion bath. It is well known that a stainless steel mandrel can be laminated with a dry film positive photoresist in those areas where orifices and other features are to be formed. The photoresist is then exposed to ultra-violet light through a mask that, following development of the photoresist, creates features of insulation such as pads, pillars, and dikes, which will correspond to the orifices, and other structures desired in the orifice plate. At the conclusion of a predetermined period of time related to the temperature in concentration of the plating bath, the magnitude of the DC current used for the plating current, and the thickness of the desired orifice plate, the mandrel and newly formed orifice plate electroform are removed from the plating bath, allowed to cool and the orifice plate electroform is peeled from the mandrel. Since stainless steel has an oxide coating, plated metals only weakly adhere to the stainless steel and the electroformed metal orifice plate can usually be removed without damage. The orifice plate electroform may then be separated or singulated into individual orifice plates for application to a printhead.

It should be understood that many types of mandrels, having solid or composite structures, might be used in the electroforming process described hereinabove. In one embodiment, a plate of glass or another dielectric material such as silicon, having a conductive coating thereon (usually a coating of a metallic material such as stainless steel) has a dielectric material deposited over the conductive coating in a predetermined pattern. The conductive coating having the patterned dielectric formed thereover functions as a cathodic electrode as described hereinabove in the electroforming process.

As described in U.S. Pat. No. 6,145,963 to Pidwerbeckie et al, a patent that is commonly assigned herewith and which is hereby incorporated by reference, orifice plates having a thickness less than 45 microns typically require special processing steps to overcome their inherent flimsiness and fragility. The method for overcoming these drawbacks described in the '963 patent involves an annealing process where by internal stresses are minimized by exposing the orifice plates to elevated temperatures under a controlled setting. However, where orifice plates are thinner than 20 microns annealing alone many not be sufficient to overcome the inherent fragility of the orifice plates 511.

One manner in which the relative flimsiness and fragility of orifice plates thinner than 20 microns may be overcome, involves the use of relatively large breaktabs 400 such as those described in U.S. Pat. No. 6,663,224, a patent that is commonly assigned herewith and hereby incorporated by reference, see FIGS. 6 and 7, in the formation of an orifice plate electroform. Breaktabs 400 connect the respective orifice plates where multiple orifice plates are electroformed in a single sheet 555. The breaktabs 400 are cut or otherwise severed in the process of singulating the individual orifice plates from the sheet 555. Increasing the length of the breaktabs 400 from about 300 microns to about 1200 microns increases the strength of the sheet 555. Another embodiment of breaktabs 400 includes forming the ends 402 of thereof in shapes that avoid stress concentrations that can lead to or propagate fractures in the orifice plates. In the embodiment illustrated in FIG. 7, the ends 402 of breaktabs 400 may be circular in shape rather than v-shaped.

Another manner in which the strength of the orifice plates 511 may be increased involves augmenting the size and/or number of ribs 404 that are formed between the moats 307. In some embodiments, moats 307 may be formed to extend the entire length of the orifice plate 511. However, this results in a relatively weak structure in that the aperture in the orifice plate 511 defined by such large moats 307 essentially divides the orifice plate in two. By increasing the size and/or number of the ribs 404, the orifice plate is strengthened. Note that the dimensions and numbers of the ribs 404 and/or moats 307 may vary between applications. What is more, in some embodiments it may be desireable to increase the thickness of the ribs 404 and or form discontinuities (not shown) in the orifice plate 511 that extend into or out of the plane of the remainder of the orifice plate 203. This can be accomplished by forming complementary depressions or protrusions in the mandrel on which the orifice plates 511 are electroformed.

Figure 6:
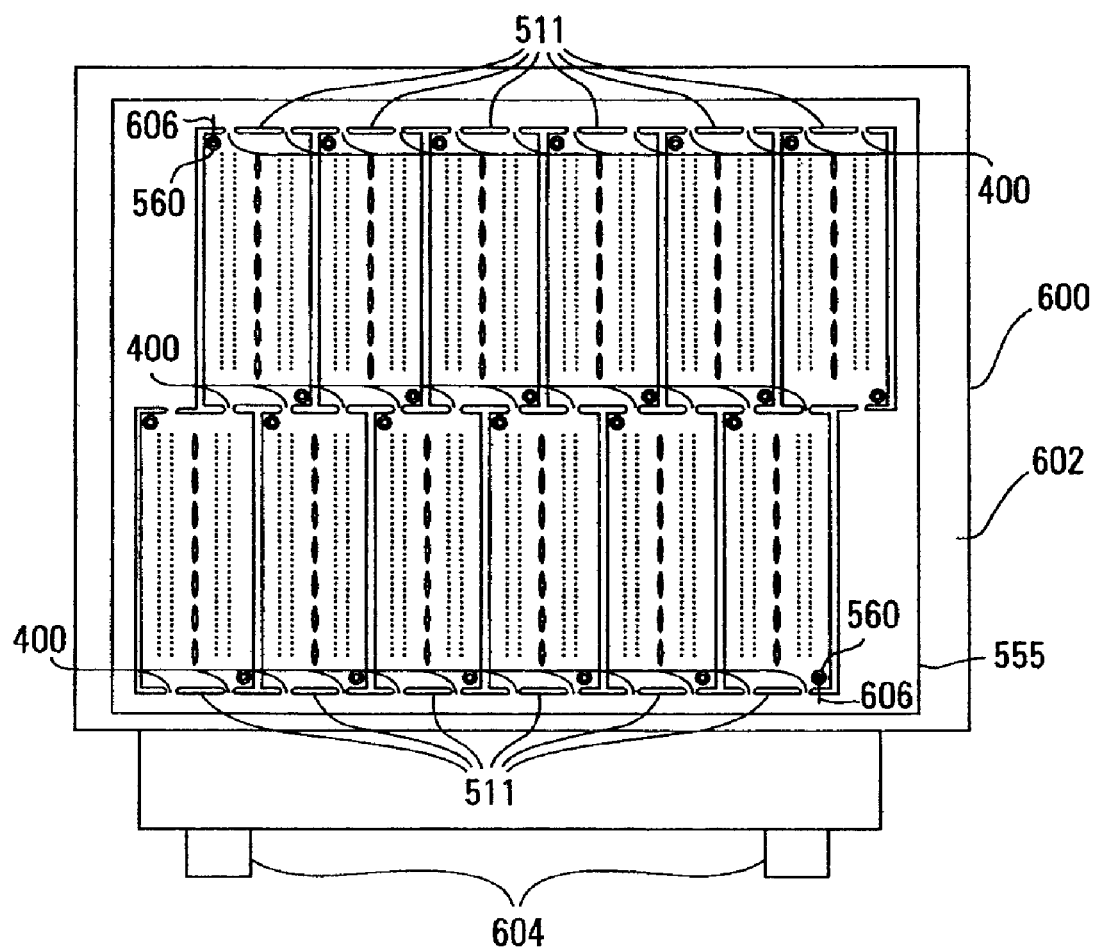
FIG. 6 is an illustration of a work holder that may be used to support a sheet of orifice plates for processing.
Figure 7:
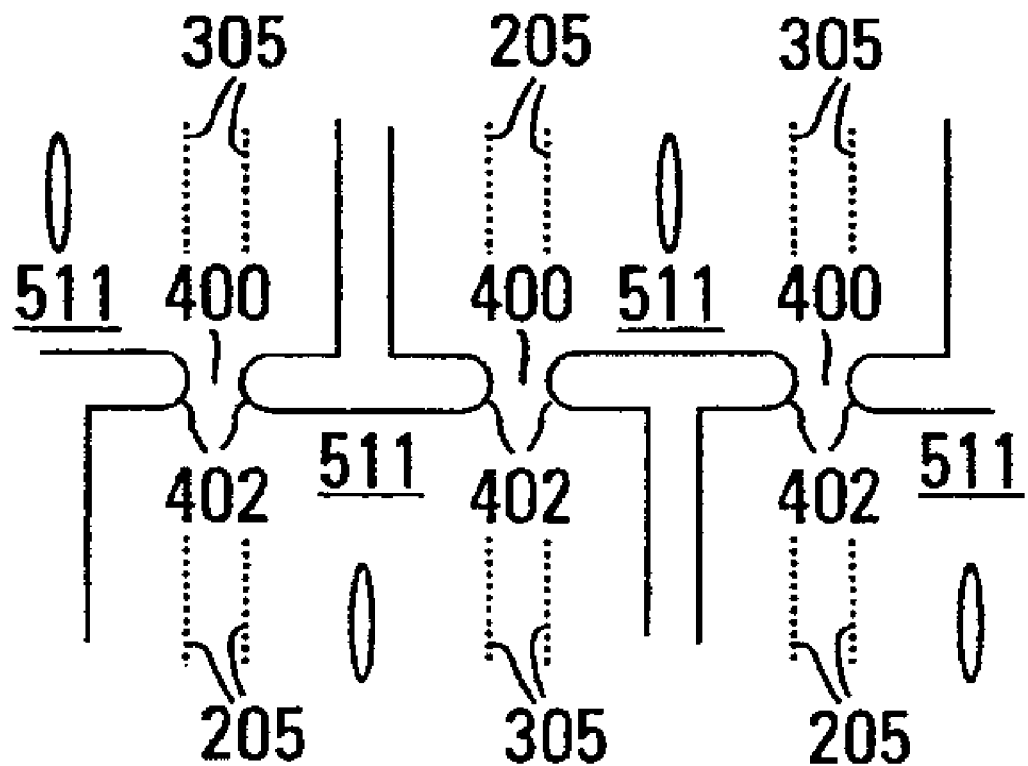
FIG. 7 is a close up illustration of one embodiment of breaktabs that connect individual orifice plates in a sheet thereof.
Figure 8:
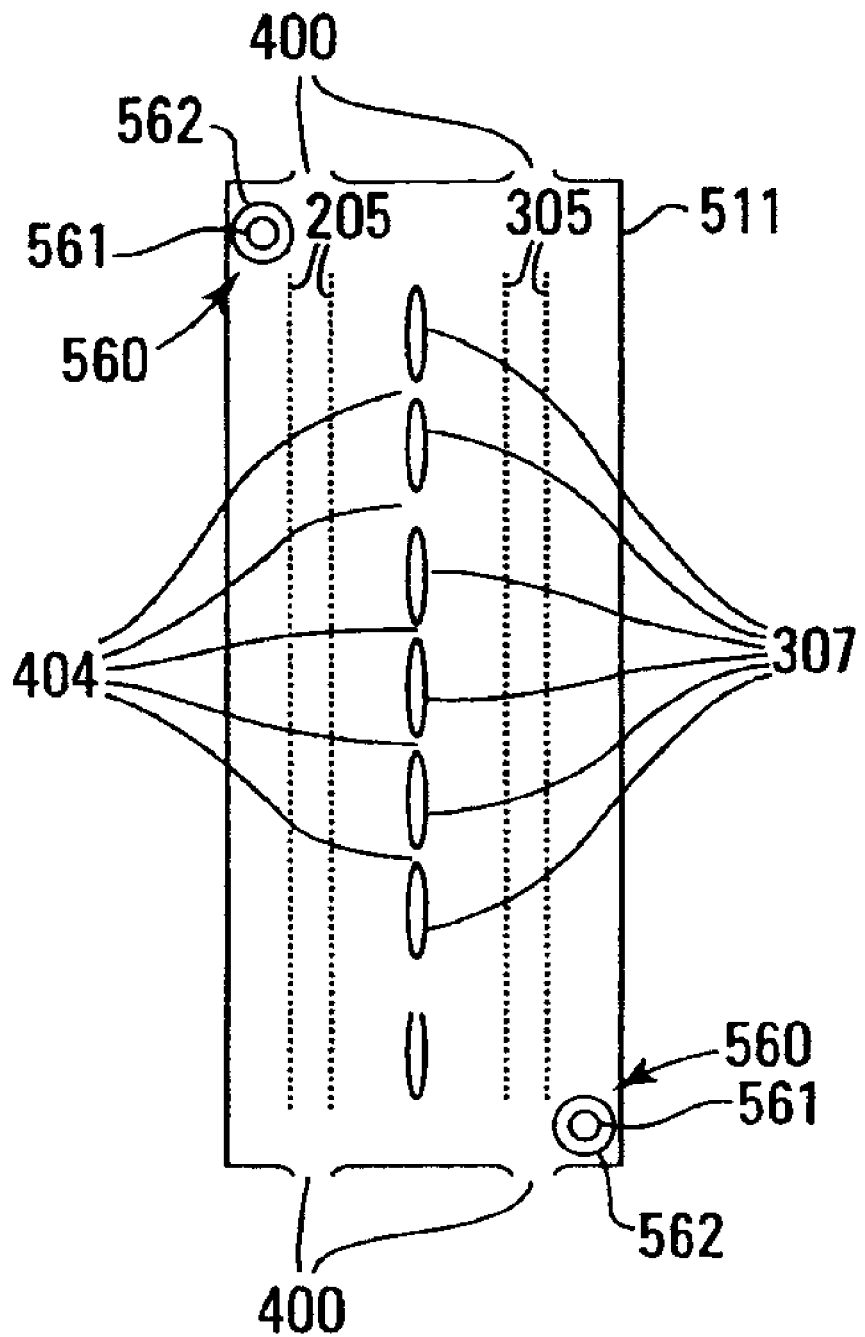
FIG. 8 is a partial view of an embodiment of an orifice plate that includes moats and ribs.

Yet another manner in which the relative fragility of orifice plates 511 thinner than 20 microns may be overcome, involves reducing the amount of handling that the orifice plates are subjected to. In one embodiment, an electroform sheet 555 that includes multiple orifice plates 511 is temporarily coupled to a magnetic work holder 600 as shown in FIG. 6. The magnetic work holder 600 may be made of an appropriately magnetic material, have an electromagnetic device (not shown) incorporated therein, or have one or more layers of a suitably magnetic material applied to its face 602. The work holder 600 may also be provided with a registration mechanism such as tabs 604. Tabs 604, or a similar structure, are adapted to register the magnetic work holder 600 with various processing equipment that is addressed to the sheet 555 of orifice plates 511. Note that in other embodiments, the work holder 600 may utilize negative air pressure or other means for securing the sheet 555 and/or orifice plate 511 thereto.

In one embodiment, the sheet 555 is addressed to the work holder 600 to register the sheet with the registration tabs 604. In this manner, the registration tabs 604 may be used to register the sheet 555 to successive apparatus that perform certain fabrication steps thereon. The sheet 555 may be addressed to the work holder 600 manually or by means of known manipulation mechanisms. Orientation of the sheet 555 may similarly be undertaken manually or by means of a known orientation mechanism. Where the sheet 555 is not registered to the registration tabs 604, the work holder 600 may be manipulated to properly orient the sheet 555 mounted thereon with a processing device. Alternatively, the processing device may itself be adjustable to orient itself and/or its operative parts to the sheet 555.

Once the electroform sheet 555 has been addressed to the face 602 of the magnetic work holder 600, the sheet 555 mounted on the work holder 600, is addressed to a mechanism for performing a fabrication operation thereon. In one embodiment, a cutting operation is carried out to separate or singulate the individual orifice plates 511 from the sheet 555. One type of device used to singulate the orifice plates 511 from the sheet 555 is a laser. Other fabrication operations may also be performed on the sheet 555 and/or the orifice plates 515 where the sheet 555 and orifice plates 515 remain mounted on the work holder 600.

Once the multiple orifice plates 511 have been singulated, each one is then removed, one at a time, from the magnetic work holder by a gripping device (not shown) and addressed to a barrier layer 515 on a print head substrate 505 as shown in FIG. 5. Preferably, the orifice plate 511 will have an alignment structure 560 that is used to properly align the orifice plate 511 with the firing chambers 509 and other structures formed in the barrier material 515 on the semi-conductor substrate 505. In one embodiment, the alignment structure 560 includes an annular ring 562 formed around a bore 561 as shown in FIG. 3. Given the large size of the bore 561 in relation to the thickness of the orifice plate 511, it is not uncommon for the bore 561 to be slightly asymmetric. Since many optical alignment systems used to coordinate the placement of the orifice plates 511 on the barrier material 515 require a symmetrical reference, a reference such as an annular ring 562 may be provided during the electrodeposition process. In aligning the orifice plate with the barrier material 515, an image looking through the bore 561 to a fiducial mark (not shown) of a known type on the barrier material 515 or semiconductor substrate 505 is taken. This image also includes the annular ring 562. By measuring the distance between the annular ring 562 and the center of the fiducial mark, the alignment of the orifice plate 511 with respect to the barrier material 515 may be determined. Depending on the nature of the alignment structure 560 and the fiducial mark, it may be possible to use only a single pair of these structures to determine the position and orientation of the orifice plate 511 with respect to the barrier material 515. However, it is preferred to utilize at least two pairs of alignment structures 560 and fiducial marks in aligning the orifice plate 511 with the barrier material 515. Note also that the alignment structure 560 and fiducial marks may be used to align an orifice plate 511 with the barrier material 515 using an automated or manual optical alignment system. Note that where one or more of the orifice plates 511 in a sheet 555 are provided with alignment structures 560, the alignment structures 560 may be used in conjunction with posts 606 to physically register the sheet 555 with the work holder 600.

In fabricating a printhead according to the present invention, it is desirable to ensure that there is good contact, or 'wetting out', between an orifice plate 511 and the barrier material 515. Accordingly, in one embodiment, semiconductor substrate 505 and the barrier material 515 disposed thereon are heated prior to the placement of the orifice plate 511 thereon. In an embodiment that uses an epoxy-type photoresist such as SU-8™ or IJ5000™ (available as described above) as a barrier material, the barrier material 515 is brought to a temperature of approximately 135° C. as a prelude to a staking process wherein the orifice plate 511 is secured to the barrier material 515. In some embodiments and as a practical matter, the combined semiconductor 505 and barrier material 515 construct is held in a support structure. In some instances, it may be useful to heat the support structure (not shown) and allow heat energy to be transferred to the semiconductor layer 505 and barrier material 515 from the support structure to raise the temperature of the barrier material 515. In one such embodiment, the support structure may be raised to a temperature in the neighborhood of 138° C. to achieve a temperature of approximately 135° C. in the barrier material 515.

Once an orifice plate 511 has been placed onto the barrier material 515 as described above to form a print head assembly, the print head assembly is then subjected to a staking process whereby the orifice plate 511 and the barrier material 515 are bonded to one another and wherein the temperature of the barrier material 515 is raised to a point at or above its glass transition temperature ($T_g$). In order to facilitate the permanent attachment of the orifice plates 511 to the barrier materials 515, it is desired to raise the temperature of the barrier material 515 to a point near and preferably above the $T_g$ of the barrier material 515. Raising the temperature of the barrier material 515 in this way results in a more complete contact between the orifice plate 511 and the barrier material 515, thereby preventing the formation of gaps or holes between the two structures. What is more, the elevation of the temperature of the barrier material 515 tends to render the barrier material 515 somewhat adherent, thereby promoting a strong bond between the orifice plate and the barrier material. In one embodiment, the orifice plates 511 are gently and uniformly pressed onto the barrier material 515 as the printhead assembly is subjected to elevated temperatures.

One mechanism for pressing the orifice plate 511 onto the barrier material 515 is a vacuum actuated diaphragm press. In practice, one or more print head assemblies are placed in an oven or heating chamber that is adapted for heating the print head assemblies at an elevated pressure. In general, elevated pressures are not required for the staking process to be successful. However, embodiments of the staking process that utilize a diaphragm press will require a pressure differential as will be described hereinbelow.

Figure 9:
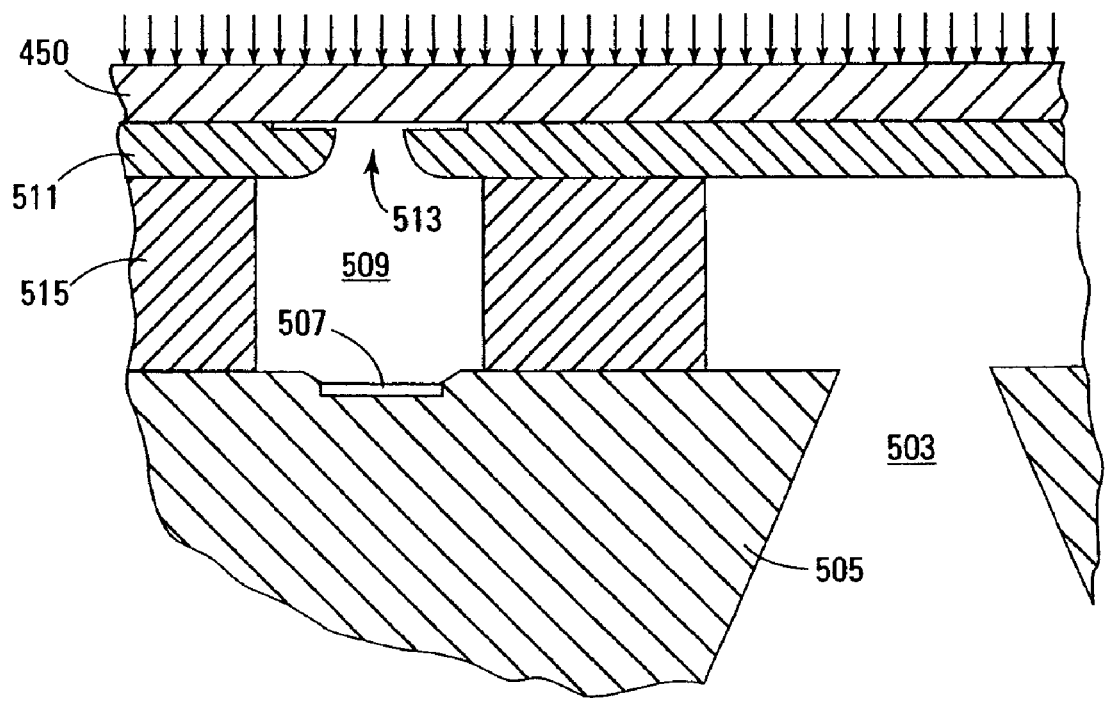
FIG. 9 illustrates a cross section of the firing chamber of the printhead of FIG. 5 wherein a diaphragm is disposed over an orifice plate.

As can be seen in FIG. 9, a relatively rigid diaphragm 450 is placed over the one or more print head assemblies in the heating chamber. In one embodiment, the diaphragm 450 is a 3 mil thick sheet of a material called Kapton™, which is available commercially from the 3M Corporation of St. Paul, Minn. The diaphragm 450 rests directly on the orifice plates 511 of the one or more printhead assemblies. The heating chamber is then closed, heat is applied, and the pressure within the chamber is elevated to a predetermined level on the order of about 75 PSI. A pressure differential is created across the diaphragm 450 as between the elevated pressures within the heating chamber and air captured by the diaphragm in the barrier material 515 of the printhead assembly. This pressure differential acts to draw the diaphragm toward the print head assemblies in the heating chamber, thereby compressing the orifice plates 511 onto the barrier material 515. This results in substantially full facial contact between the barrier materials 515 and the orifice plates 511. Note that thinner, more flexible diaphragms may be used in this staking process. However, relatively flexible diaphragms allow for localized variations in the surface geometry of a print head assembly, as the diaphragm will tend to conform to localized discontinuities of the print head assembly geometry. This phenomenon is referred to as "dimpling" and may result in sub-optimal print head performance. Accordingly, it is desired to utilize a relatively more rigid diaphragm in the staking process to reduce such discontinuities and to impart a more planar geometry to the orifice plates 511. While in the heating chamber, the print head assembly is subjected to elevated temperatures in a manner that facilitates the attachment of the orifice plate 511 to the barrier material 515. In one embodiment, the print head assembly is subjected to an elevated temperature of approximately 180° C. for approximately 7 minutes.

Once the staking process is completed, the diaphragm is removed from the print head assemblies. Using the same or a distinct heating chamber, the print head assemblies are then subjected to a baking process that cures the barrier material 515 to complete the print head assembly. In order to prevent oxidation of the orifice plate 511 and/or the barrier material 515, one embodiment uses a heating chamber that provides an inert atmosphere such as for example, a nitrogen atmosphere. The baking process raises the temperature of the barrier material 515 above its curing temperature. In order to avoid thermal shock and/or the formation of thermal stresses within the print head assembly and particularly the barrier material 515, in one embodiment the temperature within the heating chamber will be raised slowly to a predetermined target temperature that is at or above the curing temperature of the barrier material 515. After a predetermined dwell time at the target temperature, the temperature in the heating chamber will be slowly lowered to a point at which the finished print head assembly may be safely removed from the heating chamber. In one embodiment, the print head assemblies remain in the heating chamber for approximately 1 hour. In this embodiment, the temperature within the heating chamber is raised gradually from a starting temperature to a target temperature of approximately 220° C. over a period of about 15 minutes. The target temperature is maintained within the heating chamber for approximately 30 minutes, after which the temperature within the heating chamber is gradually lowered over a period of approximately 15 minutes to an ending temperature. The starting temperature is preferably in the neighborhood of 180° C., but may vary depending on the exact implementation of the process. In addition, it is to be understood that the time and temperature profile of the baking process may be varied depending on the structure of the print head assembly, the nature of the materials from which the print head assembly is made, and the starting and ending temperatures of the print head assembly.

Once the printhead is fully assembled, each line of orifices having the aforementioned dimensions and characteristics is capable of printing a resolution of up to 2400 dpi. For each color group, however, there are two lines of orifices separated by a distance, D, that is approximately 300-1500 microns +−10%. Furthermore, the orifices in one line are off-set in the direction parallel to that line by a distance of approximately 15-75 microns relative to the orifices in the other orifice line of the color group so that dots placed on the medium by the second line of orifices will fall between the dots placed on the medium by the orifices in the first line of orifices. A staggered, two line printing nozzle configuration has been described in U.S. Pat. No. 5,635,968, "Thermal Inkjet Printer Printhead With Offset Heater Resistors", to Bhaskar et al. The printer is provided with an operating algorithm which delays the printing of dots from the second line of orifices for a period of time long enough for the dots to be coordinated with the dots of the first line of orifices, in this way, a resolution of up to 2400 dpi is achieved. Depending upon the operating algorithm of the printer, as the printhead is moved with relation to the medium to be printed upon, all of the dots necessary for a particular image or character may be printed as the motion proceeds in one direction. Alternatively, dots resulting from droplets ejected by one line of orifices may have interstitial dots placed by the second line of orifices as the printhead is moved first in one direction and then in another relative to the printed medium.

Thus by optimizing the thickness of the orifice plate, the diameter of the ink ejecting orifices, and the orifice to orifice spacing, one is able to realize a printhead and an inkjet printer employing the printhead having the ability to print high-resolution images and characters.

What is claimed is:

1. A method of manufacturing a printhead for an inkjet print cartridge, comprising:
    depositing a metal film on a mandrel;
    separating the metal film from the mandrel;
    mounting the metal film to a work holder;
    modifying the metal film while the metal film remains mounted on the work holder;
    laminating the metal film to a barrier material and semiconductor substrate to form a printhead; and
    applying heat to the printhead such that the printhead barrier layer is cured and the metal film is bonded thereto;
    wherein laminating the metal film to the barrier material comprises:
        preheating the barrier material; and
        placing the metal film on the preheated barrier material.

2. The method of manufacturing a printhead for an inkjet print cartridge of claim 1 further comprising cutting the metal film into a plurality of discrete orifice plates.

3. The method of manufacturing a printhead for an inkjet print cartridge of claim 2 comprising transferring individually the plurality of discrete orifice plates onto respective barrier materials on semiconductor substrates to form a plurality of printheads.

4. The method of manufacturing a printhead for an inkjet print cartridge of claim 1 further comprising aligning the metal film on the work holder in a predetermined position relative to the work holder.

5. The method of manufacturing a printhead for an inkjet print cartridge of claim 1 wherein the work holder further comprises at least one registration mechanism that is arranged in a known relationship to the position of the metal film on the work holder.

6. The method of manufacturing a printhead for an inkjet print cartridge of claim 1 further comprising coupling the metal film to the work holder magnetically.

7. The method of manufacturing a printhead for an inkjet print cartridge of claim 1 further comprising coupling the metal film to the work holder pneumatically.

8. The method of manufacturing a printhead for an inkjet print cartridge of claim 1 wherein the metal plate comprises at least one orifice plate having a thickness in the range of about 6 to 19 microns.

9. The method of manufacturing a printhead for an inkjet print cartridge of claim 1 wherein the metal plate comprises at least one orifice plate having a plurality of orifices disposed through the orifice plate from a first surface to a second surface and at least two orifices of the plurality of orifices having centers at the second surface spaced apart by a distance having a range of about 15 to 75 microns.

10. The method of manufacturing a printhead for an inkjet print cartridge of claim 1 wherein the metal plate comprises at least one orifice plate having a plurality of orifices disposed through the orifice plate from a first surface to a second surface and at least two of the plurality of orifices having an orifice opening at the second surface with a diameter having a range of about 3 to 20 microns.

11. The method of manufacturing a printhead for an inkjet print cartridge of claim 1, wherein laminating the metal film to the barrier material further comprises:
    placing a diaphragm on the metal film after the metal film is placed on the preheated barrier material; and
    creating a pressure differential across the diaphragm that causes the diaphragm to compress the metal film onto the barrier material.

12. The method of manufacturing a printhead for an inkjet print cartridge of claim 11, wherein the diaphragm is about 3 mil thick.

13. The method of manufacturing a printhead for an inkjet print cartridge of claim 1, further comprising aligning the metal film with the barrier material on the semiconductor substrate, wherein aligning the metal film with the barrier material comprises:
    taking an image of a mark on the barrier material through a bore through the metal film, the image containing an annular ring formed in the metal film around the bore; and
    measuring a distance in the image between the mark on the barrier material and the annular ring to determine alignment of the metal film with respect to the barrier material.

14. The method of manufacturing a printhead for an inkjet print cartridge of claim 1, wherein the barrier material is preheated to approximately 135° C.

15. The method of manufacturing a printhead for an inkjet print cartridge of claim 1, further comprising forming a rib extending out of a plane of the metal film and between a pair of moats formed through the metal film.

16. The method of manufacturing a printhead for an inkjet print cartridge of claim 15, wherein the rib extending out of a plane of the metal film is formed using complementary depressions in the mandrel.

17. The method of manufacturing a printhead for an inkjet print cartridge of claim 1 wherein the work holder further comprises at least one registration mechanism that is configured to register the metal film to successive apparatus that perform certain fabrication steps thereon.

* * * * *

UNITED STATES PATENT AND TRADEMARK OFFICE
CERTIFICATE OF CORRECTION

PATENT NO. : 7,942,997 B2  Page 1 of 1
APPLICATION NO. : 12/099606
DATED : May 17, 2011
INVENTOR(S) : Rio Rivas et al.

It is certified that error appears in the above-identified patent and that said Letters Patent is hereby corrected as shown below:

In column 11, line 47, in Claim 5, delete "claim 1" and insert -- claim 4 --, therefor.

Signed and Sealed this
Eighteenth Day of October, 2011

David J. Kappos
*Director of the United States Patent and Trademark Office*